(12) United States Patent
Choi

(10) Patent No.: US 7,200,087 B2
(45) Date of Patent: Apr. 3, 2007

(54) METHOD OF DETECTING A TYPE OF DISC USING A REFERENCE RATIO AND DETECTED RATIO

(75) Inventor: Bong-hwoan Choi, Cyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 505 days.

(21) Appl. No.: 10/281,234

(22) Filed: Oct. 28, 2002

(65) Prior Publication Data
US 2003/0133381 A1 Jul. 17, 2003

(30) Foreign Application Priority Data
Jan. 15, 2002 (KR) .................... 2002-2263

(51) Int. Cl.
*G11B 7/00* (2006.01)

(52) U.S. Cl. .................... 369/53.23

(58) Field of Classification Search ............ None
See application file for complete search history.

(56) References Cited

U.S. PATENT DOCUMENTS

| | | | |
|---|---|---|---|
| 5,808,993 A | | 9/1998 | Lee |
| 5,859,824 A | * | 1/1999 | Izumi et al. ............ 369/44.29 |
| 6,147,946 A | | 11/2000 | Yamada et al. |
| 6,249,494 B1 | * | 6/2001 | Ueki .................... 369/44.27 |
| 6,556,302 B2 | * | 4/2003 | Ishihara ................. 356/445 |

FOREIGN PATENT DOCUMENTS

| | | |
|---|---|---|
| EP | 1 139 342 | 10/2001 |
| JP | 04-123320 | 4/1992 |
| JP | 09-274765 | 10/1997 |
| JP | 10-214451 | 8/1998 |
| JP | 10-312269 | 11/1998 |
| JP | 10-334571 | 12/1998 |
| JP | 11-066712 | 3/1999 |
| JP | 11-213530 | 8/1999 |
| JP | 2000-011528 | 1/2000 |
| JP | 2000-030353 | 1/2000 |
| JP | 2000-149392 | 5/2000 |
| JP | 2001-023287 | 1/2001 |

* cited by examiner

*Primary Examiner*—William Korzuch
*Assistant Examiner*—Joseph Haley
(74) *Attorney, Agent, or Firm*—Staas & Halsey LLP

(57) ABSTRACT

A method detects a disc using signals generated from a light irregularly reflected from pits formed on a recording surface of the disc. The method detects a ratio of a peak-to-peak value of a first signal generated from the irregular reflection to a peak-to-peak value of a second signal generated from the irregular reflection. The method further detects the disc according to magnitudes of the first and second signals and the detected ratio.

12 Claims, 6 Drawing Sheets

NUMBER OF S-CURVES : 1     MAGNITUDE OF S-CURVE : AT LEAST 2V

NUMBER OF S-CURVES : 2     MAGNITUDE OF S-CURVE : LESS THAN 2V

NUMBER OF S-CURVES : 1    MAGNITUDE OF S-CURVE : LESS THAN 2V

NUMBER OF S-CURVES : 2    MAGNITUDE OF S-CURVE : AT LEAST 2V

NUMBER OF S-CURVES : 1    MAGNITUDE OF S-CURVE : LESS THAN 2V

NUMBER OF S-CURVES : 2    MAGNITUDE OF S-CURVE : AT LEAST 2V

METHOD OF DETECTING A TYPE OF DISC USING A REFERENCE RATIO AND DETECTED RATIO

CROSS-REFERENCE TO RELATED APPLICATIONS

This application claims the benefit of Korean Application No. 2002-2263 filed Jan. 15, 2002, in the Korean Intellectual Property Office, the disclosure of which is incorporated herein by reference.

BACKGROUND OF THE INVENTION

1. Field of the Invention

The present invention relates to a method of driving a disc, and more particularly, to a method of detecting a disc using a ratio of peak-to-peak values of S-curves.

2. Description of the Related Art

An S-curve indicates a signal acquired from irregular reflection from a pit formed on a recording medium such as a DVD, when light is radiated on a recording surface of the recording medium. For DVDs, a single disc is distinguished from a dual disc by a magnitude of the S-curve signal or a number of S-curve signals. However, because the S-curve signal is not uniform due to a change in a quantity of light or a reflection factor of a pickup (not shown), an error occurs when detecting the disc.

FIGS. 1A and 1B are flowcharts of a conventional method to detect the disc. FIG. 1A shows a method to detect the disc based on the number of S-curve signals. The number of S-curve signals is detected at operations 100a and 102a. If the number of S-curve signals is 1, the disc is detected as the single disc and a setting is performed at operation 103a. If the number of S-curve signals is 2, the disc is detected as the dual disc and the setting is performed at operation 104a. If an S-curve is not detected at operation 100a, an error occurs in a disc detection at operation 101a. FIG. 1B shows a method to detect the disc based on the magnitude of the S-curve signal. The magnitude of the S-curve signal is detected at operations 100b and 102b. If the magnitude of the S-curve signal is at least 2V, the disc is detected as the single disc and setting is performed at operation 103b. If the magnitude of the S-curve signal is less than 2V, the disc is detected as the dual disc and setting is performed at operation 104b. If the magnitude of the S-curve signal does not exceed 200 mV at operation 100b, the disc error is detected at operation 101b. Because the reflection factor of the dual disc is less than that of the single disc by 40–60%, the magnitude of an S-curve signal detected through the pickup from the dual disc is less than that from the single disc. FIG. 2A is a diagram of a waveform when the disc is detected as the single disc. The number of S-curve signals is 1, and the magnitude of the S-curve signal is at least 2V. FIG. 2B is a diagram of a waveform when the disc is detected as the dual disc. The number of S-curve signals is 2, and the magnitude of the S-curve signals is less than 2V.

Because the S-curve signal S_CURVE is not uniform due to a change in the quantity of light or reflection factor of the pickup, a single/dual disc detection error may occur as shown in FIGS. 2C and 2D. Referring to FIG. 2C, the disc may be detected as the single disc based on the number of S-curve signals but may be detected as the dual disc based on the magnitude of the S-curve signal. Referring to FIG. 2D, the disc may be detected as the dual disc based on the number of S-curve signals but may be detected as the single disc based on the magnitude of the S-curve signals. In the case of a DVD+RW and a DVD−RW, as shown in FIGS. 2E (DVD+RW) and 2F (DVD−RW), the disc may be detected as the dual disc based on the magnitude of the S-curve signal but may be detected as the single disc because the number of S-curve signals is 1. Accordingly, it is difficult to detect the disc.

SUMMARY OF THE INVENTION

Various objects and advantages of the invention will be set forth in part in the description that follows and, in part, will be obvious from the description, or may be learned by practice of the invention.

In accordance with an embodiment of the present invention, there is provided a method to detect a disc using a ratio of peak-to-peak values of first and second S-curve signals generated from an irregular reflection from a recording medium.

In accordance with an embodiment of the present invention, there is provided a method of detecting a disc using signals generated from a light irregularly reflected from pits formed on a recording surface of the disc. The method includes: detecting a ratio of a peak-to-peak value of a first signal generated from the irregular reflection to a peak-to-peak value of a second signal generated from the irregular reflection; and detecting the disc according to magnitudes of the first and second signals and the detected ratio.

The detection of the disc includes: comparing the magnitudes of the first and second signals with a first reference value; and comparing the detected ratio with a second reference value to detect the disc.

When comparing the magnitudes of the first and second signals, the disc is initially detected as a single disc when the magnitude of one of the first and second signals exceeds the first reference value, and the disc is initially detected as a dual disc when the magnitudes of the first and second signals is less than the first reference value.

When comparing the detected ratio, if the disc is initially detected as the single disc for which the magnitude of one of the first and second signals exceeds the first reference value, the detected ratio is compared with the second reference value and the disc is detected as the single disc if the detected ratio is at least the second reference value and as the dual disc if the detected ratio is less than the second reference value.

When comparing the detected ratio, if the disc is initially detected as the dual disc for which the magnitudes of the first and second signals do not exceed the first reference value, the detected ratio is compared with the second reference value and the disc is detected as a re-writable (RW) disc if the detected ratio is at least the second reference value and as the dual disc if the detected ratio is less than the second reference value.

In accordance with an embodiment of the present invention, there is provided a method of detecting a disc using signals generated from a light irregularly reflected from pits formed on a recording surface of the disc, including: determining whether a magnitude of one of first and second signals generated from the irregular reflection exceeds a voltage; detecting the disc as a single disc where the magnitude of one of the first and second signals exceeds the voltage; determining a ratio of peak-to-peak values between the first and second signals; determining whether the ratio between the first and second signals is at least a predetermined value; detecting the disc as a DVD-single where the ratio is at least the predetermined value; and detecting the disc as a DVD-dual where the ratio is less than the predetermined value.

In accordance with an embodiment of the present invention, there is provided a method of detecting a disc using signals generated from a light irregularly reflected from pits formed on a recording surface of the disc, including: determining whether a magnitude of one of first and second signals generated from the irregular reflection is less than a voltage; detecting the disc as a dual disc where the magnitude of one of the first and second signals is less than the voltage; determining a ratio of peak-to-peak values between the first and second signals; determining whether the ratio between the first and second signals is at least a predetermined value; detecting the disc as a DVD-RW where the ratio is at least the predetermined value; and detecting the disc as a DVD-dual where the ratio is less than the predetermined value.

In accordance with an embodiment of the present invention, there is provided a method of detecting a disc using signals generated from a light irregularly reflected from pits formed on a recording surface of the disc, including: determining whether a magnitude of one of first and second signals generated from the irregular reflection exceeds a voltage; detecting the disc as a single disc where the magnitude of one of the first and second signals exceeds the voltage; detecting the disc as a dual disc where the magnitude of one of the first and second signals is less than the voltage; determining a ratio of peak-to-peak values between the first and second signals; determining whether the ratio between the first and second signals is at least a predetermined value; detecting the disc as the single disc where the ratio is at least the predetermined value; and detecting the disc as the dual disc where the ratio is less than the predetermined value.

These together with other aspects and advantages which will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

These and other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Hereinafter, embodiments of the present invention will be described in detail with reference to the attached drawings. The present invention may, however, be embodied in many different forms and should not be construed as being limited to the embodiments set forth herein; rather, these embodiments are provided so that the present disclosure will be thorough and complete, and will fully convey the concept of the invention to those skilled in the art.

Figure 3:
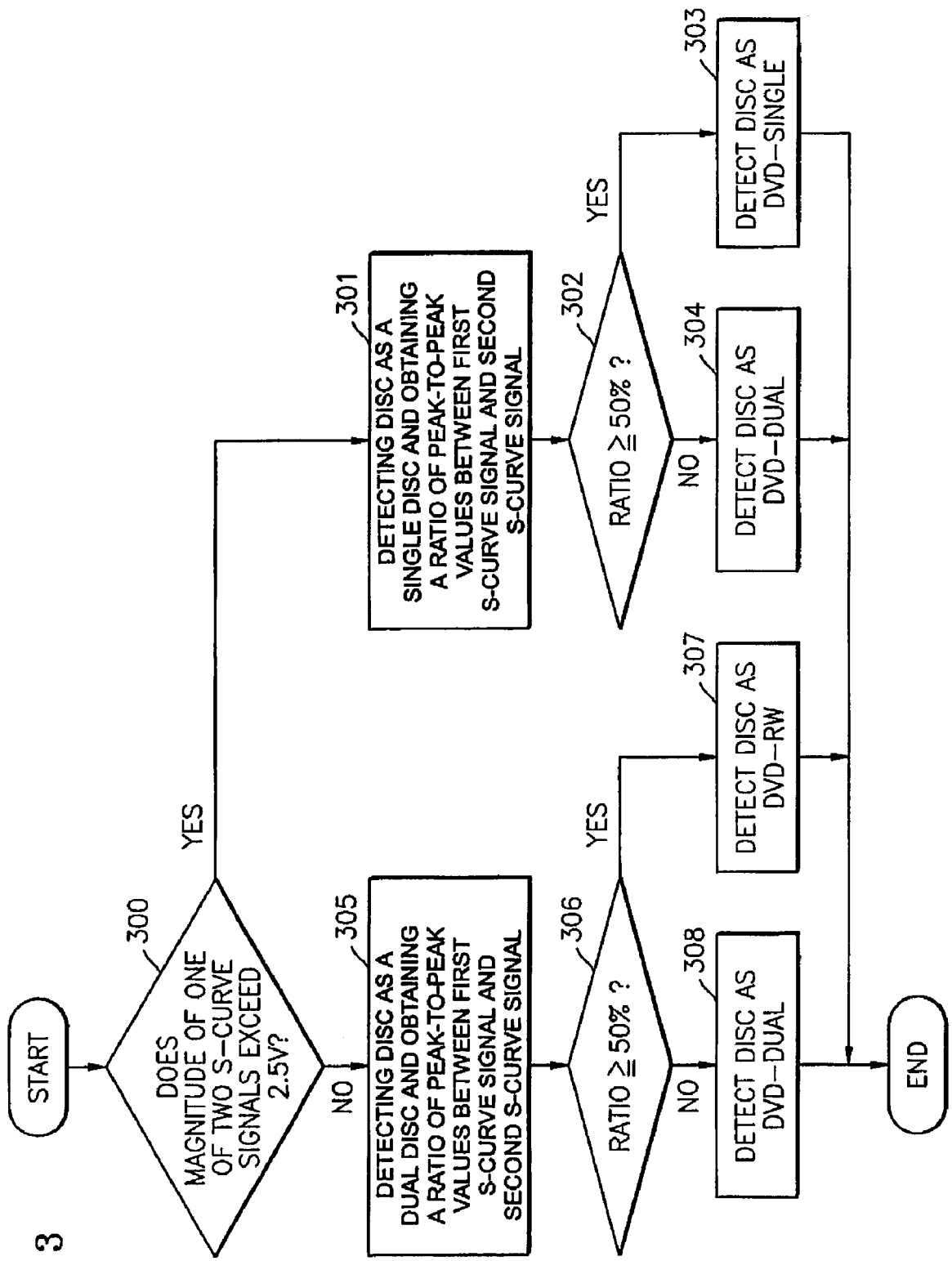
FIG. 3 is a flowchart of a method to detect the disc, according to an embodiment of the present invention.

Hereinafter, the present invention will be described in detail with reference to FIG. 3. The following description concerns a case where a disc is detected based on a magnitude of an S-curve signal or a number of S-curve signals.

Figure 1A:
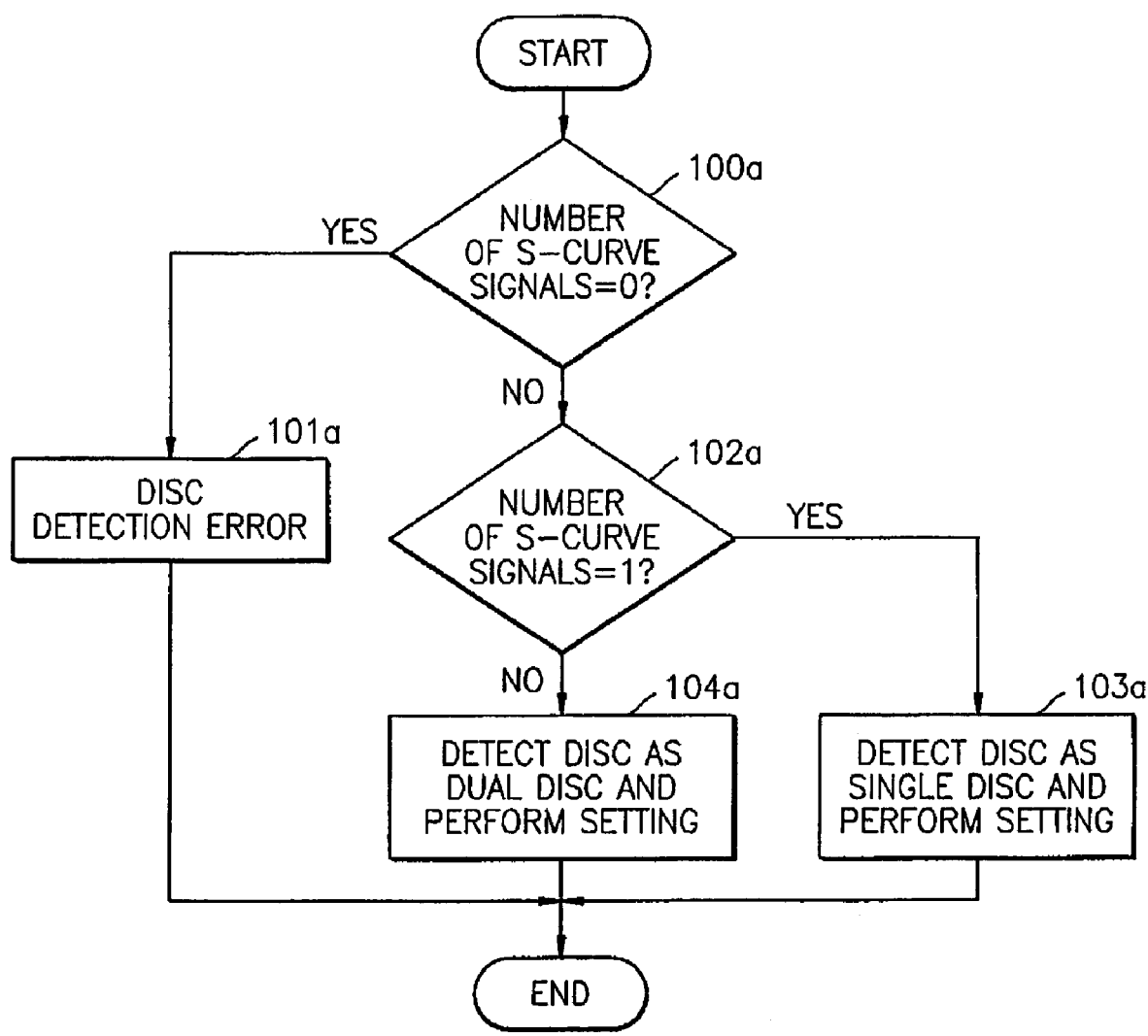
FIG. 1A shows a conventional method to detect a disc based on a number of S-curve signals.
Figure 1B:
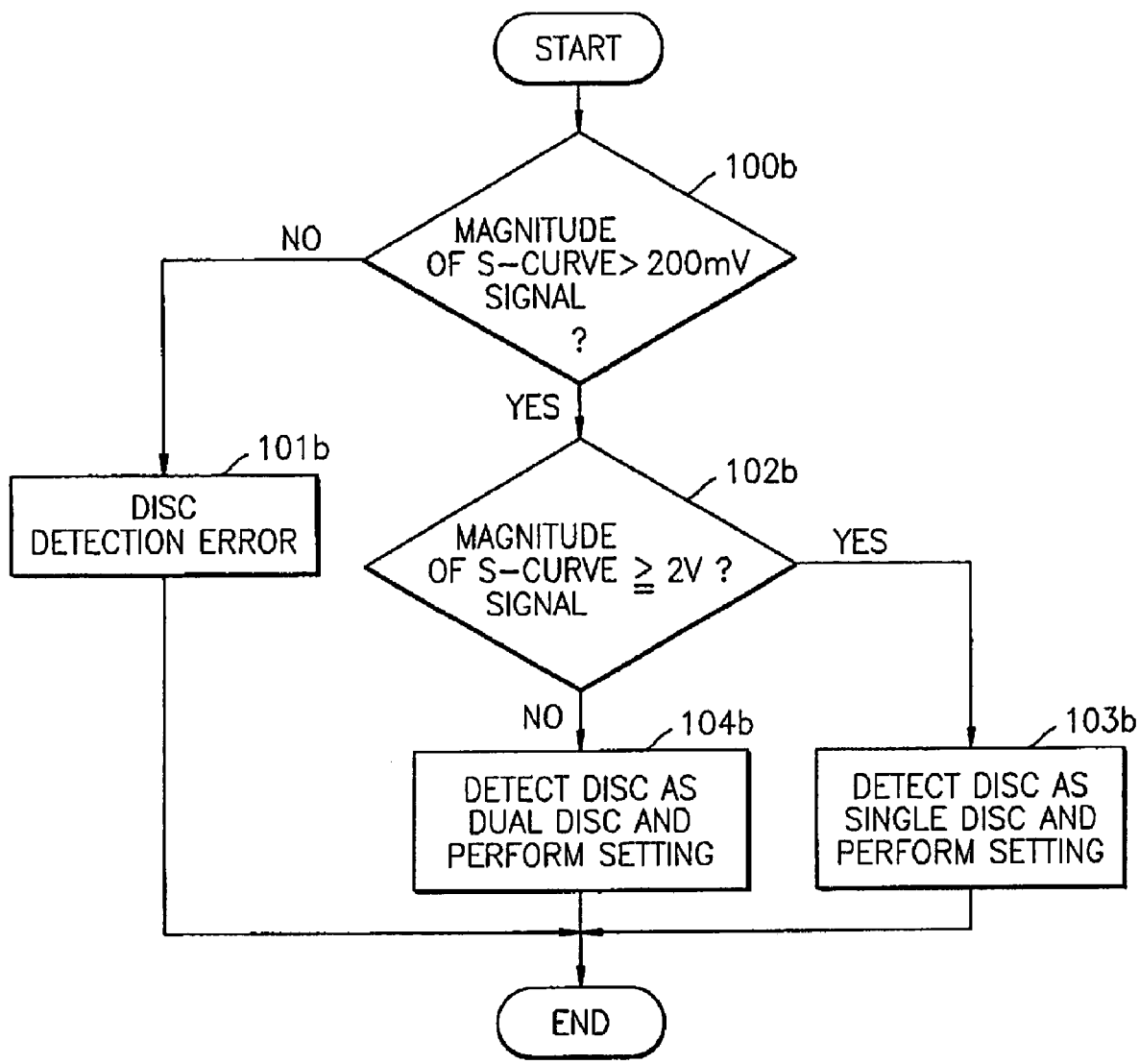
FIG. 1B shows a conventional method to detect the disc based on a magnitude of an S-curve signal.
Figure 2A:
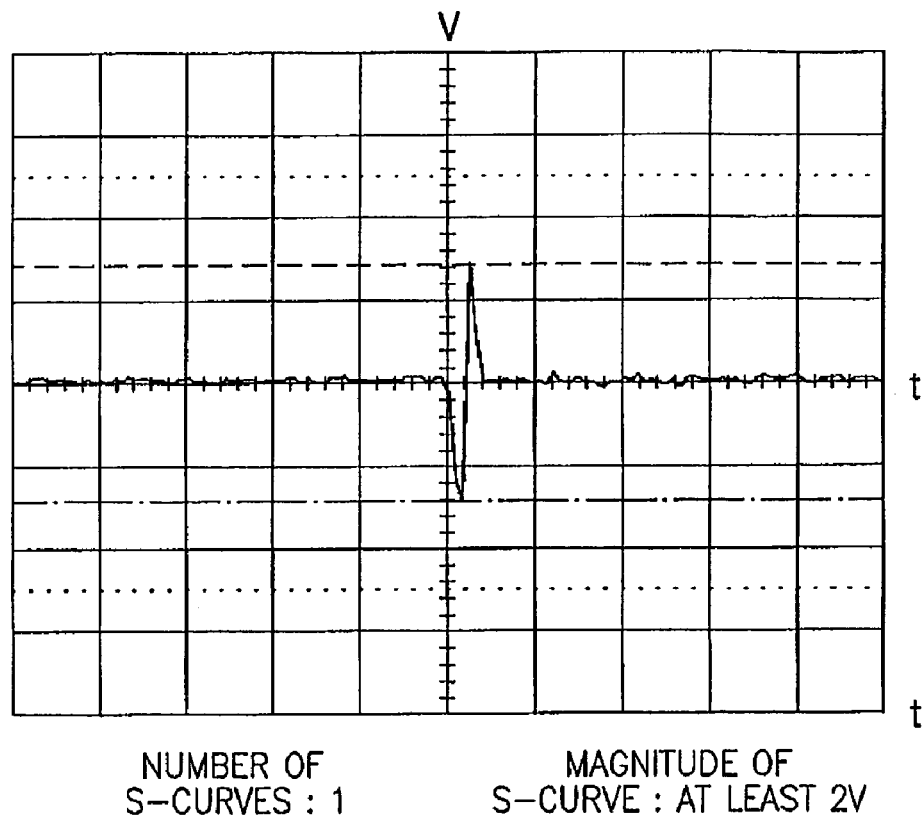
FIG. 2A is a diagram of a waveform when the disc is detected as a single disc.
Figure 2B:
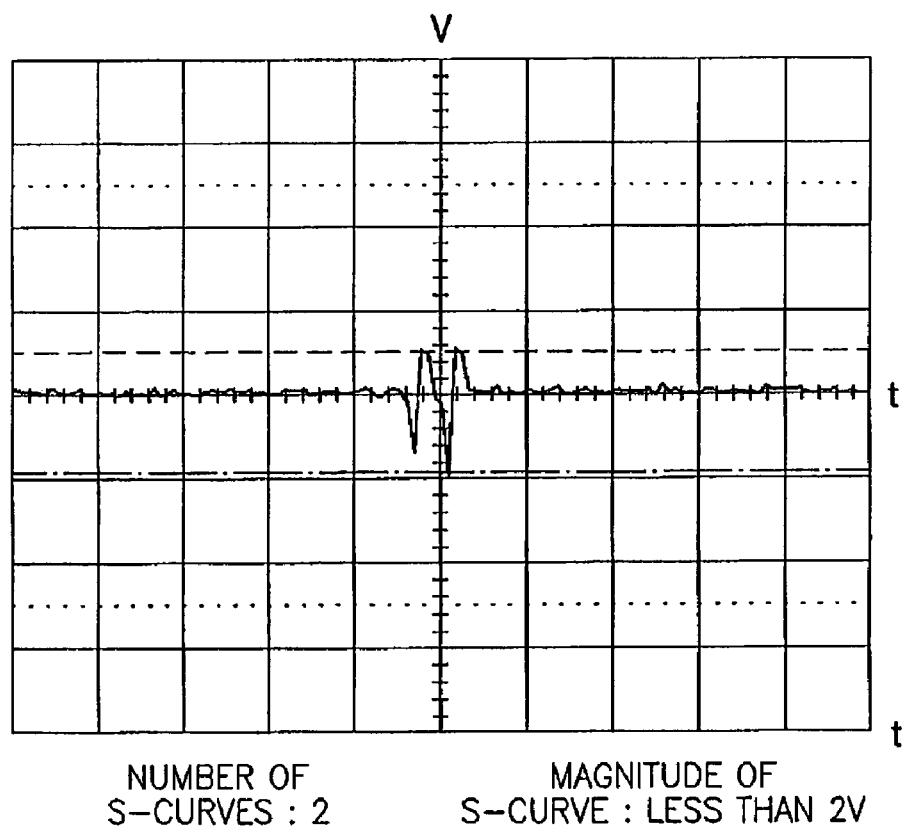
FIG. 2B is a diagram of a waveform when the disc is detected as a dual disc.
Figure 2C:
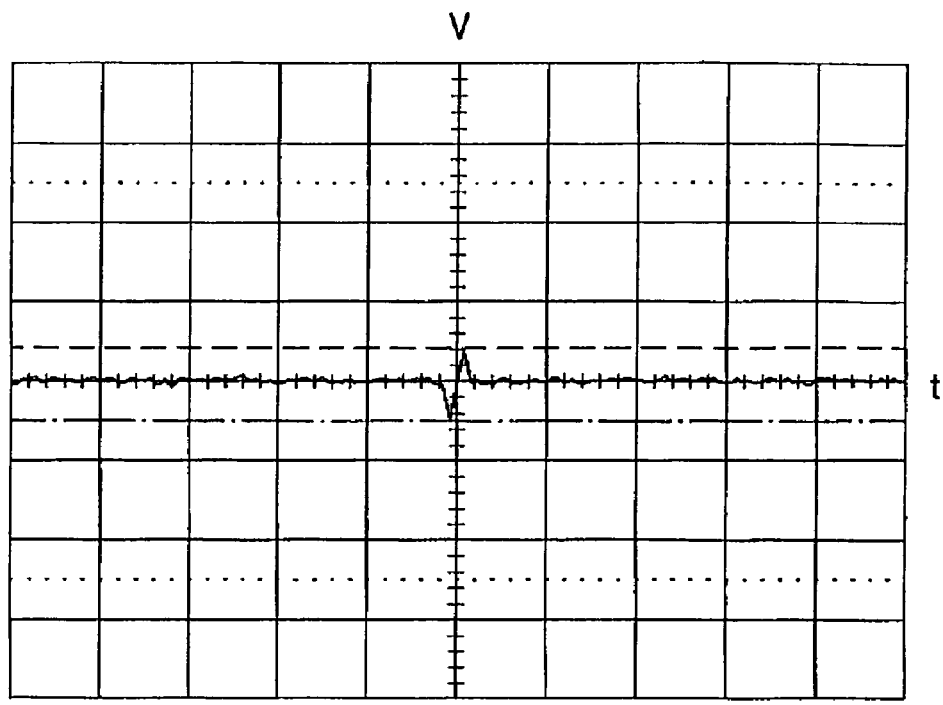
FIG. 2C is a diagram of a waveform where the disc is detected as the single disc based on the number of S-curve signals or may be detected as the dual disc based on the magnitude of the S-curve signal.

A single disc is erroneously detected as a dual disc as shown in FIG. 2C when the magnitude of the S-curve signal is saturated. Also, the single disc is erroneously detected when it is determined that a number of S-curve signals is 2 due to a parasitic curve formed by a signal whose magnitude increases in front of the S-curve to the magnitude of the S-curve signal obtained from the dual disc due to pickup characteristics. Further, the single disc is erroneously detected when a magnitude of a focus error is small due to a dispersion of a pickup.

As described above, considering a case where the single disc is erroneously detected as the dual disc, a ratio of peak-to-peak values between S-curve signals is used. Because the peak-to-peak ratio of the single disc is at least 50% of the peak-to-peak ratio of the dual disc, a disc detection error does not occur.

Figure 2D:
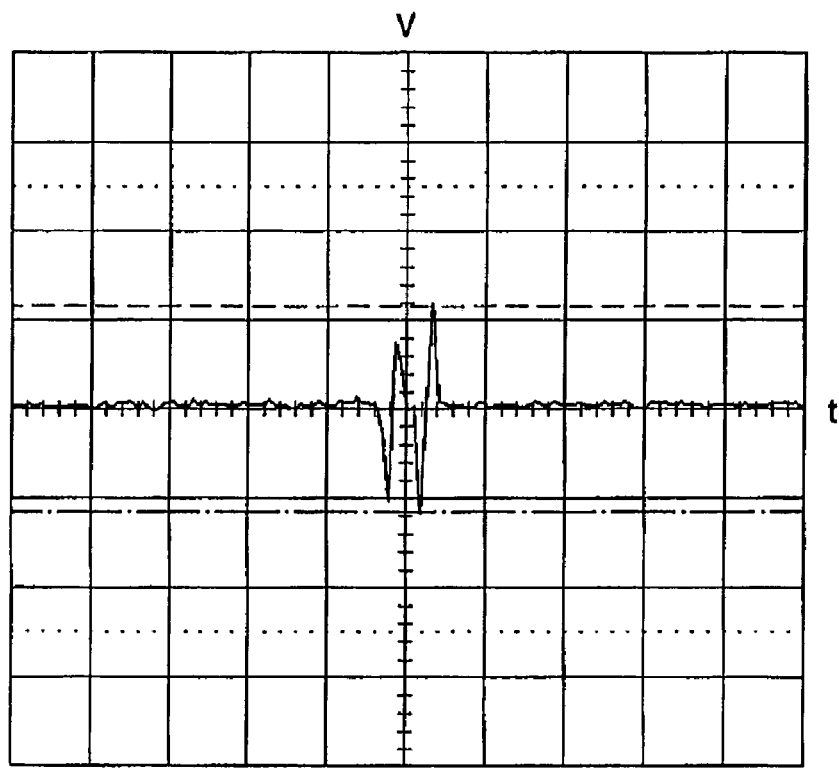
FIG. 2D is a diagram of a waveform where the disc is detected as the dual disc based on the number of S-curve signals or may be detected as the single disc based on the magnitude of the S-curve signals.

The dual disc is erroneously detected as the single disc as shown in FIG. 2D, when it is determined that the number of S-curve signals is 1 because the magnitude of one of two S-curve signals is very small or when the magnitude of the focus error is large due to a dispersion of the pickup.

As described above, considering the case where the dual disc is erroneously detected as the single disc, the ratio of peak-to-peak values between the S-curve signals is used. Because the peak-to-peak ratio of the dual disc is less than 50% of the peak-to-peak ratio of the single disc, the disc detection error does not occur.

Figure 2E:
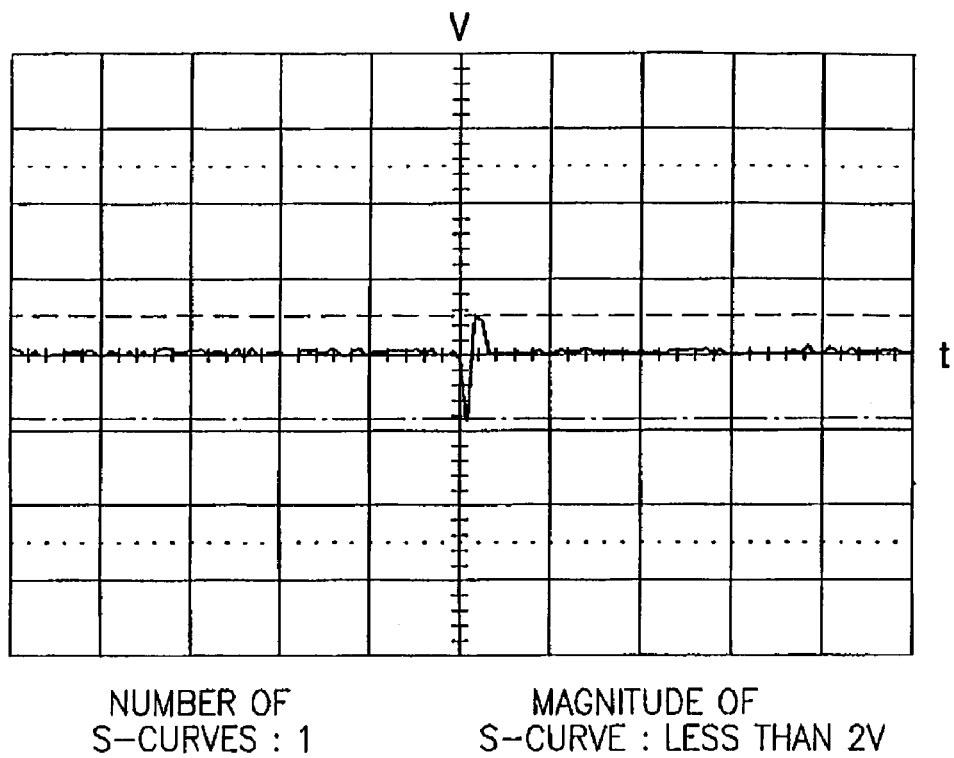
FIG. 2E is a diagram of a waveform where a DVD+RW is detected as the dual disc based on the magnitude of an S-curve signal or may be detected as the single disc based on the number of S-curve signals.
Figure 2F:
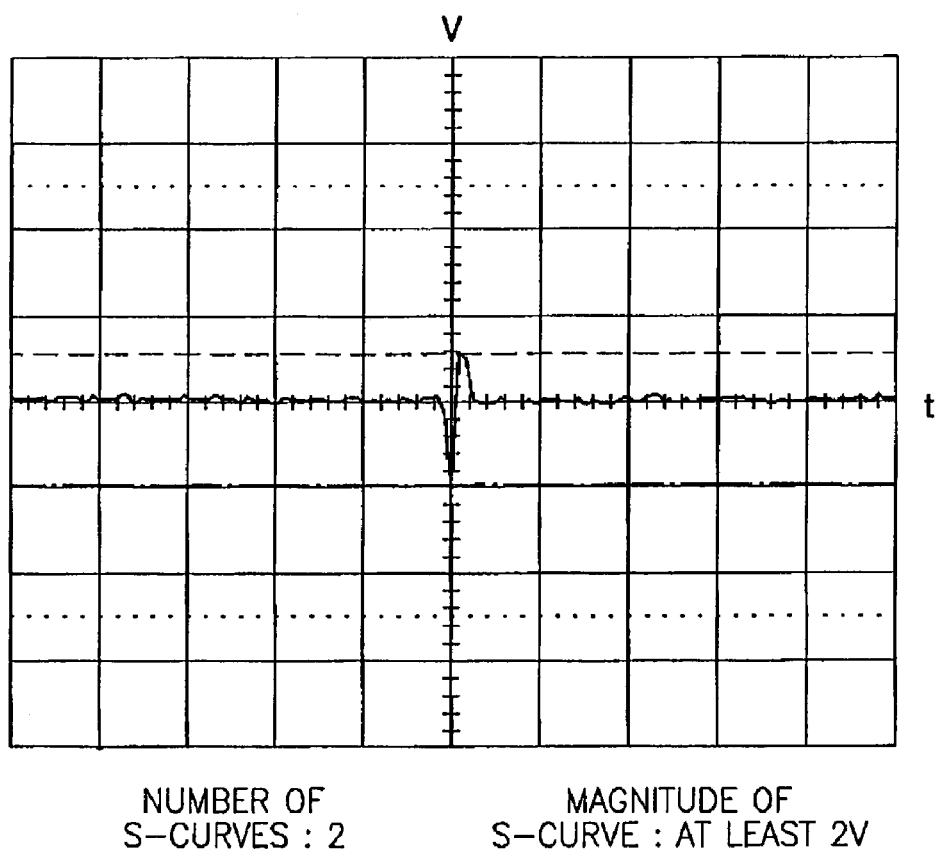
FIG. 2F is a diagram of a waveform where a DVD-RW is detected as the dual disc based on the magnitude of an S-curve signal or may be detected as the single disc based on the number of S-curve signals.

In a case of a DVD+RW or a DVD-RW, the magnitude of one S-curve signal is detected as for the dual disc, but one S-curve signal is used to detect the single disc, as shown in FIGS. 2E and 2F, which makes the disc detection difficult. For this case, after the DVD+RW or the DVD-RW is recognized as the dual disc, the ratio of the peak-to-peak values between the S-curve signals is used to prevent the disc detection error from occurring.

In a method to prevent the disc detection error from occurring at operation 300, the method determines whether the magnitude of one of two S-curve signals exceeds 2.5 V. Here, the value 2.5 V is a reference value to distinguish the single disc from the dual disc. Because a reflection factor of the single disc is greater than that of the dual disc by about 40–60%, the magnitude of an S-curve signal detected through the pickup with respect to the single disc is greater than that with respect to the dual disc.

If it is determined that the magnitude of one of the two S-curve signals exceeds 2.5 V, at operation 301, the disc is initially detected as the single disc, and the ratio of peak-to-peak values between first and second S-curve signals is obtained. At operation 302, the method determines whether the obtained ratio between the first and second S-curve signals is at least 50%. At operation 302, if the method determines that the ratio is at least 50%, the disc is detected as a DVD-single. However, at operation 304, if the method determines that the ratio is less than 50%, the disc is detected as a DVD-dual.

At operation 300, if the method determines that the magnitudes of the two S-curve signals do not exceed 2.5 V, at operation 305, the disc is initially detected as the dual disc, and the ratio of peak-to-peak values between the first and second S-curve signals is obtained. Detection of the dual or a RW disc can be performed based on the ratio between the S-curve signals. Here, even if the disc is actually the RW disc, it is initially recognized as the dual disc, and is then detected based on the ratio of the peak-to-peak values between the first and second S-curve signals. In the case of the DVD+RW or the DVD−RW, the magnitude of the one S-curve signal is detected for the dual disc, but one S-curve signal is detected for the single disc. Based on the method described above, the RW disc can be distinguished from the dual disc.

At operation 306, the method determines whether the obtained ratio between the first and second S-curve signals is at least 50%. If it is determined that the ratio is at least 50%, at operation 307, the disc is detected as a DVD−RW. Here, the disc is detected as the DVD−RW when the ratio between the S-curve signals is at least 50% because the ratio for the RW disc is the same as that for the single disc. However, if it is determined that the ratio is less than 50%, at operation 308, the disc is detected as the DVD-dual.

As described above, according to the present invention, a disc is detected using a ratio of the peak-to-peak values between first and second S-curve signals generated from a light irregularly reflected from a disc, thereby suppressing occurrence of disc detection errors and achieving quick disc playback.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of detecting a disc using signals generated from a light irregularly reflected from pits formed on a recording surface of the disc, the method comprising:
   obtaining the maximum amplitude value of a first generated irregular-reflection signal and the maximum amplitude value of a second generated irregular-reflection signal and detecting a ratio between the two maximum amplitude values;
   comparing magnitudes of the irregular-reflection signals with a reference voltage and outputting a first comparison result;
   comparing the detected ratio with a reference ratio and outputting a second comparison result; and
   determining whether the disc is a single disc, a dual disc, or an RW disc based on the first and second comparison results,
   wherein the light, which is irregularly reflected from pits formed on the recording surface of the disc, originates from a single light source and is directed toward the disc, and
   wherein the light originating from the single light source has only one wavelength.

2. The method of claim 1, wherein, in the determining whether the disc is a single disc, a dual disc, or an RW disc based on the first and second comparison results, according to the first comparison result, the disc is detected as a single disc when the magnitude of the irregular-reflection signal exceeds the reference voltage, and the disc is detected as a dual disc when the magnitude of the irregular-reflection signal is less than the reference voltage.

3. The method of claim 2, wherein, in the determining whether the disc is a single disc, a dual disc, or an RW disc based on the first and second comparison results, after the disc is detected as a single disc according to the first comparison result, according to the second comparison result, the disc is finally detected as a single disc when the detected ratio exceeds the reference ratio, and the disc is finally detected as a dual disc when the detected ratio is less than the reference ratio.

4. The method of claim 2, wherein, in determining whether the disc is a single disc, a dual disc, or an RW disc based on the first and second comparison results, after the disc is detected as a dual disc according to the first comparison result, according to the second comparison result, the disc is finally detected as an RW disc when the detected ratio exceeds the reference ratio, and the disc is finally detected as a dual disc when the detected ratio is less than the reference ratio.

5. A method of detecting a disc using signals generated from a light irregularly reflected from pits formed on a recording surface of the disc, comprising:
   obtaining the maximum amplitude value of a first generated irregular-reflection signal and the maximum amplitude value of a second generated irregular-reflection signal and detecting a ratio between the two maximum amplitude values;
   comparing magnitudes of the irregular-reflection signals with a reference voltage and detecting the disc as a single disc when the magnitudes of the irregular-reflection signals exceed the reference voltage;
   comparing the ratio detected with respect to the single disc with a reference ratio and finally detecting the disc as a single disc when the detected ratio exceeds the reference ratio; and
   finally determining the single disc as a dual disc when the detected ratio is less than the reference ratio,
   wherein the light, which is irregularly reflected from pits formed on the recording surface of the disc, originates from a single light source and is directed toward the disc, and
   wherein the light originating from the single light source has only one wavelength.

6. The method of claim 5, wherein the reference voltage is 2.5 volts.

7. The method of claim 5, wherein the reference ratio is 50%.

8. The method of claim 5, wherein the first and second signals generated from the irregular reflection comprise S-curve signals.

9. A method of detecting a disc using signals generated from a light irregularly reflected from pits formed on a recording surface of the disc, comprising:

obtaining the maximum amplitude value of a first generated irregular-reflection signal and the maximum amplitude value of a second generated irregular-reflection signal and detecting a ratio between the two maximum amplitude values;

comparing magnitudes of the irregular-reflection signals with a reference voltage and detecting the disc as a dual disc when the magnitudes of the irregular-reflection signals are less than the reference voltage;

comparing the ratio detected with respect to the dual disc with a reference ratio and finally detecting the dual disc as an RW disc when the detected ratio exceeds the reference ratio; and finally determining the dual disc as a dual disc when the detected ratio is less than the reference ratio, wherein the light, which is irregularly reflected from pits formed on the recording surface of the disc, originates from a single light source and is directed toward the disc, and wherein the light originating from the single light source has only one wavelength.

10. The method of claim 9, wherein the reference voltage is 2.5 volts.

11. The method of claim 9, wherein the reference ratio is 50%.

12. The method of claim 9, wherein the first and second signals generated from the irregular reflection comprise S-curve signals.

* * * * *